Sept. 12, 1933.    A. F. SCHWENDNER    1,926,562
THRUST BEARING ADJUSTING MECHANISM
Filed Dec. 2, 1932    2 Sheets-Sheet 1

INVENTOR
ANTHONY F. SCHWENDNER.
BY
a. B. Reavis
ATTORNEY

Sept. 12, 1933.                A. F. SCHWENDNER                1,926,562
                        THRUST BEARING ADJUSTING MECHANISM
                           Filed Dec. 2, 1932          2 Sheets-Sheet 2
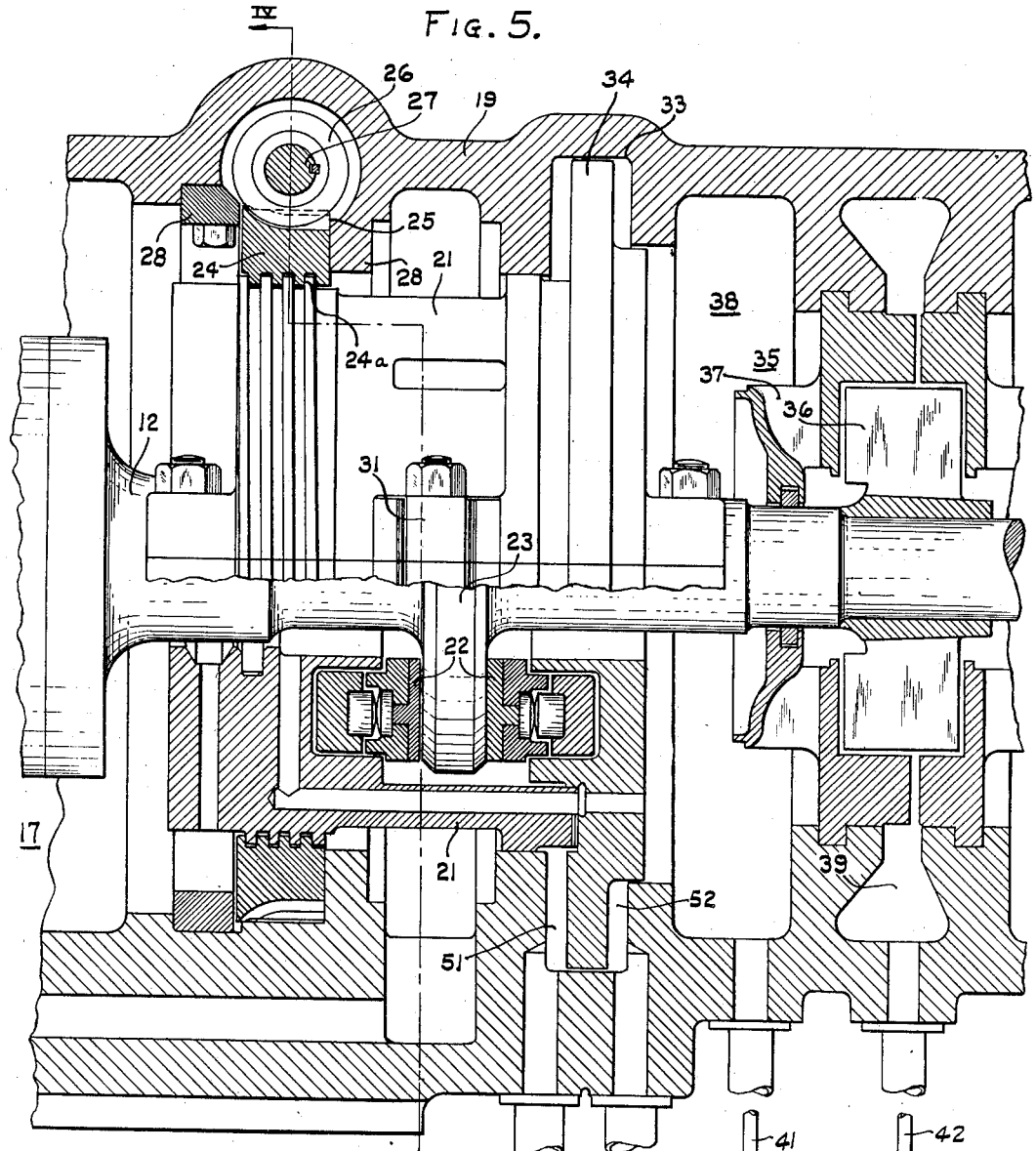
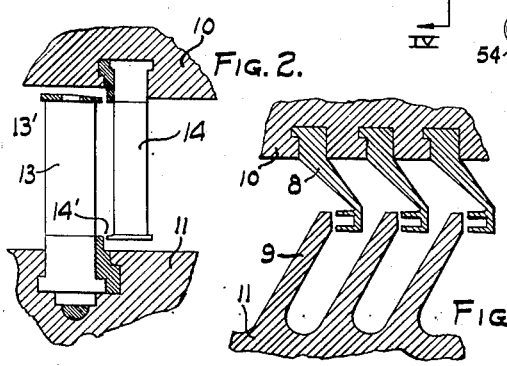
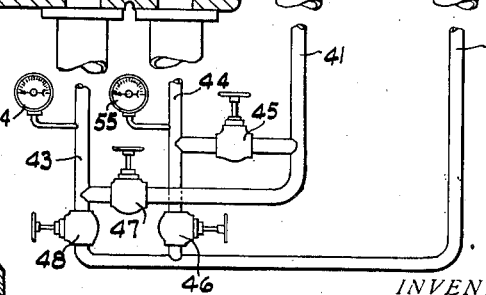
INVENTOR
ANTHONY F. SCHWENDNER.
BY
ATTORNEY Patented Sept. 12, 1933

1,926,562

UNITED STATES PATENT OFFICE 1,926,562

THRUST BEARING ADJUSTING MECHANISM

Anthony F. Schwendner, Essington, Pa., assignor to Westinghouse Electric & Manufacturing Company, East Pittsburgh, Pa., a corporation of Pennsylvania Application December 2, 1932. Serial No. 645,493

9 Claims. (Cl. 308—166)

This invention relates to thrust bearings such as are used, for example, on elastic fluid turbines, and it has for an object to provide improved means for adjusting the thrust bearing axially while under load.

Another object is to provide a mechanism which definitely determines the axial position of the thrust bearing and which may be adjusted to change the position of the thrust bearing by the application of a relatively light force.

In the operation of elastic fluid turbines, it becomes necessary at times to move the spindle shaft axially with respect to the casing to obtain proper blade clearance. It has been proposed to move the spindle shaft and the thrust member of the bearing axially by mechanical means including a hand wheel and gearing or screws; however, on large machines when the thrust is great, it becomes difficult to actuate the handwheel because of excessive friction, and relatively large parts are required to effect the adjustment.

In accordance with my invention, I provide a fluid pressure actuated device which will remove load from the adjusting means while operating the same. I preferably provide the thrust member of the bearing with a piston which is disposed within a cylinder formed within the bearing housing. When the thrust member is to be moved, fluid pressure is applied to the piston in opposition to the thrust thereon to substantially neutralize the same and thereby remove load from the adjusting means. The thrust bearing may then be moved by the adjusting means with a very light force.

These and other objects are effected by my invention as will be apparent from the following description and claims taken in connection with the accompanying drawings, forming a part of this application, in which:

Fig. 2 is a detail view showing the end-tightened blading embodied in the turbine;

Fig. 3 is a detail view showing the end-tightened or axial clearance dummy packing embodied in the turbine;

Fig. 5 is a longitudinal view in section of my improved bearing with parts broken away for clearness.

Figure 1:
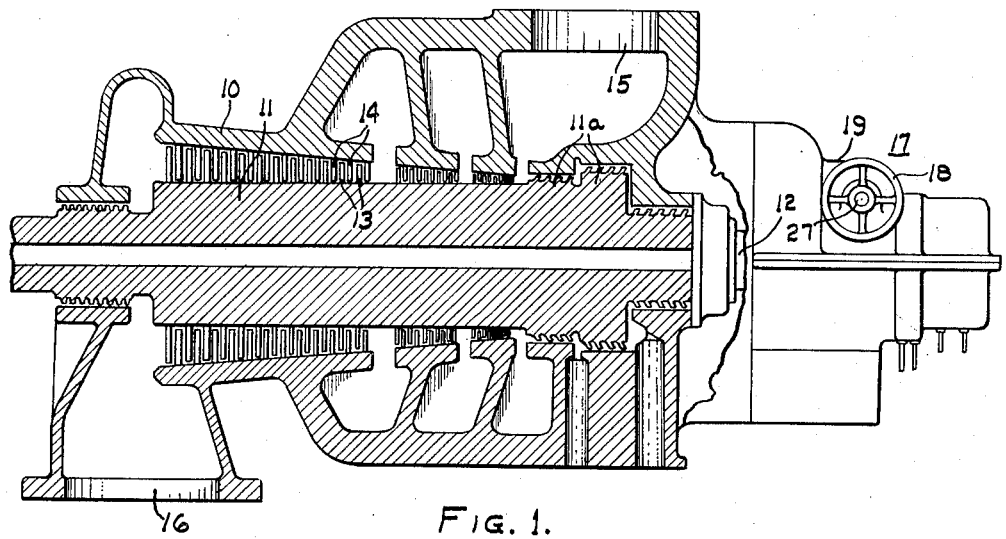
Fig. 1 is a longitudinal view in section of an elastic fluid turbine including my improved bearing.

Referring now to Fig. 1, I show an elastic fluid turbine including a casing 10 within which a spindle 11, dummy pistons 11a and having a shaft 12, is rotatively mounted. Fixed to the spindle 11 and the casing 10 are reaction blades 13 and 14, respectively, there being a pressure drop across each row of moving blades 13. The blades 13 and 14 and the dummy packing are of a type whose packing clearances may be varied by relative axial movement. As shown in Fig. 2, the blades are preferably of the end-tightened type; that is, blades having packing elements 13′ and 14′ which restrict leakage of motive fluid around the tips of the blades by providing close axial clearances. The casing 10 and the spindle 11 are also provided with end-tightened or axial clearance packing elements 8 and 9, respectively, to restrict leakage of motive fluid past the dummy pistons 11a. The axial clearances, in both cases, are increased upon movement of the spindle 11 to the left and decreased upon movement to the right.

The casing 10 is provided with an inlet 15 and an outlet 16 for motive fluid, which fluid is expanded as it passes through the passages formed by blades 13 and 14, producing rotation of the spindle in a well known manner. Due to the pressure drops across the rows of moving blades, there results a thrust to the left as viewed in Fig. 1, which is partially or wholly balanced by dummy pistons 11a. The resultant thrust, which may be to the right or to the left according to the particular design, is transmitted to a thrust bearing structure indicated generally by the numeral 17. In the present embodiment the resultant thrust is to the right.

In starting, the spindle 11 and the casing 10 are likely to be somewhat distorted because of unequal temperature distribution taking up in places the small running clearances and rendering the turbine subject to a rub. The spindle 11 is moved to provide extra large clearances, until the spindle 11 and casing 10 are uniformly heated, to reduce the possibility of rubbing.

Figure 4:
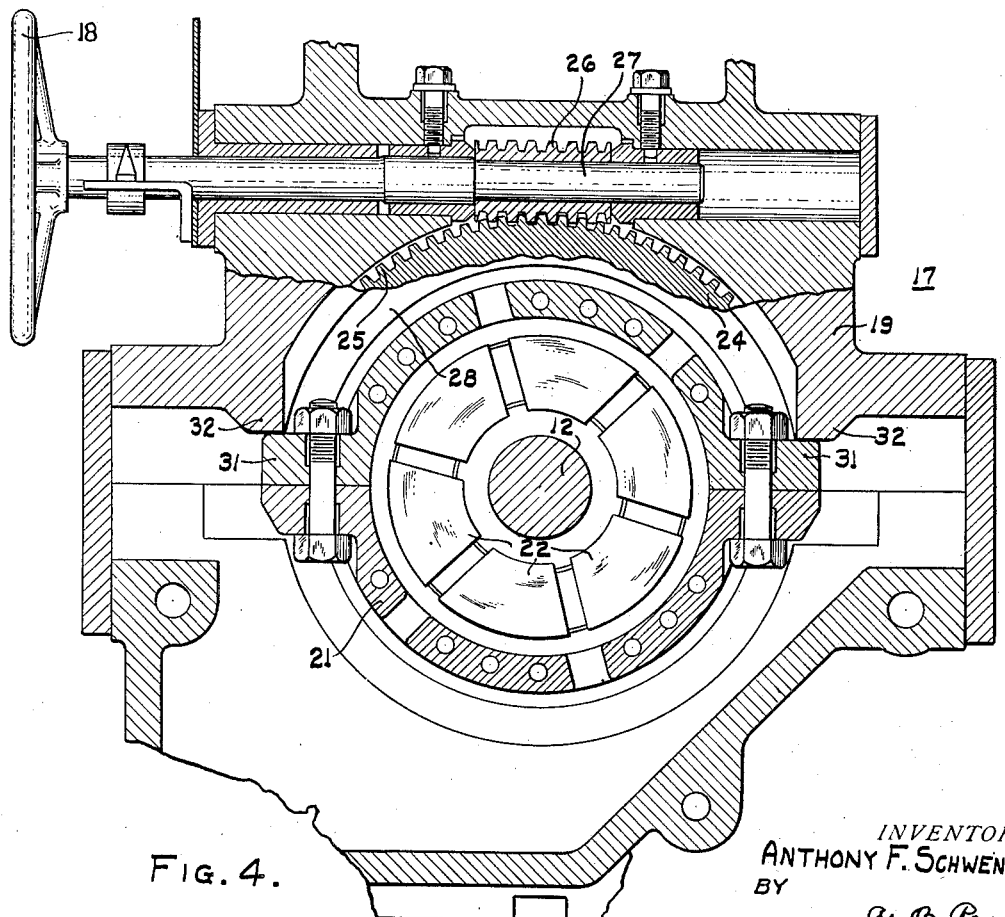
Fig. 4 is a transverse sectional view taken along the line IV—IV of Fig. 5.

In order that this movement of the spindle may be effected, the thrust bearing structure 17 is provided with a handwheel 18 which is rotated to move the spindle 11 and the shaft 12 axially, to properly position the same with respect to the casing 10. The mechanism for effecting axial movement of the spindle 11 is disclosed in Figs. 4 and 5 to which reference will now be had.

The thrust bearing structure 17 includes a housing 19 within which is disposed a thrust member 21 having bearing segments 22 arranged on each side of, and contacting a thrust collar 23 which is fixed to the shaft 12. The thrust collar 23 is positioned axially by the segments 22. A nut 24 is threaded to the thrust member 21 and has teeth 25 formed on its outer face which mesh with a worm 26 fixed to a stem 27. The stem 27 is journaled in the housing 19 and is secured to the handwheel 18 at its outer end.

It will be seen that rotation of the handwheel 18, the stem 27 and worm 26 will cause the nut 24 to rotate about the thrust member 21. Axial movement of the nut 24 is prevented by projections 28 which extend inwardly from the inner surface of the housing 19. The nut 24 is of slightly less width than the space between the projections 28, so that a small clearance, for example, .007 inch, is provided between the nut 24 and one of the projections 28 for a purpose which will hereinafter be made apparent. As the nut 24 is threaded to the thrust member 21, rotation of the former will produce an axial movement of the latter. Rotation of the thrust member 21 about the shaft is prevented by extensions 31 carried by the thrust member which bear against pads 32 formed on the housing 19.

With relatively large bearings where the thrust is great, the friction incidental to movement of the thrust member 21 may be excessive, rendering manual operation of the handwheel 18 difficult. In order to overcome this difficulty, I neutralize the thrust on the member 21 by applying fluid pressure to the same in opposition to the thrust. The sliding friction of the threaded connection 24a and of the nut 24 against projections 28 is greatly reduced, so that resistance to movement of the handwheel 18 is very low. Accordingly, I provide a cylinder 33 within the housing 19 having a piston 34 disposed therein, which piston 34 is carried by the member 21 and movable axially therewith.

The control and supply of motivating fluid for moving the piston 34 may be effected in any well known manner, but I prefer to use the arrangement shown in Fig. 5. In this arrangement, a pump 35 having an impeller 36 secured to the shaft 21 is utilized. The pump 35 has an inlet 37 communicating with a chamber 38 formed in the housing 19 which chamber 38 communicates with a supply of fluid. The pump 35 also has an outlet 39 formed in the casing 19, which outlet 39 is under pressure during operation of the pump 35.

Conduits 41 and 42 communicate with the chamber 38 and outlet 39 respectively. Conduits 43 and 44 communicate with opposite ends of the cylinder 33. Conduit 41 is adapted to communicate with conduits 43 and 44 through valves 47 and 45, respectively, and conduit 42 is adapted to communicate with conduits 43 and 44 through valves 48 and 46, respectively.

Assume it is desired to adjust the spindle 11 in the turbine shown in Fig. 1. Here the thrust is to the right, so that to oppose this thrust, fluid pressure must be admitted to the portion 52 of the cylinder 33. The valves 46 and 47 are opened and respectively connect the outlet 39 of the pump 35 to the cylinder portion 52 and the chamber 38 to the portion 51 of the cylinder 33. Fluid pressure is, therefore, provided in the cylinder portion 52 which tends to move the piston 34 and the member 21 to the left in opposition to the thrust thereon. Resistance to movement of the nut 24 and worm 26 is, therefore, substantially reduced, and movement of the handwheel 18 is easily effected. The thrust member 21 is then moved either right or left as desired until the spindle 11 has assumed its proper position. The valve 46 may then be closed to shut off the fluid pressure to the piston 34, allowing the thrust to be transmitted through the nut 24 while the same is not being actuated. In the event that the thrust is in the opposite direction or to the right, as viewed in Figs. 1 and 5, fluid pressure would then be admitted to cylinder portion 51 through conduit 42, valve 48, and conduit 43 when an adjustment of the bearing is made. In this event cylinder portion 52 would be connected to chamber 38 through conduit 49, valve 45 and conduit 41.

The value of the thrust acting on the member 21 may be determined by measuring the pressure acting on the piston 34. Pressure gauges 54 and 55 are connected to the conduits 43 and 44, respectively, and are preferably calibrated in pounds of thrust. The valve 46, or the valve 48, depending on the direction of thrust, is slowly opened, allowing pressure in the corresponding portion of the cylinder 33 to build up slowly. When the handwheel 18 turns most freely, the fluid pressure in the cylinder 33 is balancing the thrust and the reading of the corresponding gauge will indicate the value of the thrust.

In the construction described above, the mechanical adjusting means provides for definitely locating the axial position of the spindle, while the pressure actuated means provides the necessary force to oppose the thrust while the axial position is being changed. By this combination, therefore, the axial position of the spindle may be controlled by the application of a relatively light force, manual or otherwise, to the handwheel 18.

A further advantage of the above mechanism is found in connection with the grinding in of the packing elements. With this type of turbine, it is the practice to grind off the thin edges of the packing elements by actual contact with the cooperating packing surfaces in order to insure uniform packing clearances throughout. With my mechanism, taking the above embodiment as an example, this may be accomplished as follows: Fluid pressure is admitted to the cylinder portion 52, moving the spindle to the left until the clearance between the left hand side of the nut 24 and the adjacent projection 28 is taken up; that is, it moves about .007 inch. The spindle is then adjusted by means of the handwheel 18, to a clearance which is less than the clearance between the nut 24 and the projection 28 on the right-hand side, for example, a clearance of .005 inch may be provided. The fluid pressure in the cylinder portion 52 is then released for a few seconds, during which the packing elements come into actual contact with their cooperating packing surfaces, thereby grinding off the thin packing edges.

This procedure must be carried on intermittently, due to the fact that the grinding produces a large amount of heat. After a few seconds of grinding, the packing elements must be taken out of contact and allowed to cool. With my mechanism, this is easily accomplished by applying pressure to the cylinder portion 52 to move the spindle to the left in clearance-increasing direction. After the packing elements have cooled sufficiently, the pressure is discharged, and the thrust again moves the spindle to the right to bring the packing elements into contact for further grinding. If necessary, the handwheel 18 may be operated to move the spindle farther to the right for further grinding.

While I have shown my invention in but one form, it will be obvious to those skilled in the art that it is not so limited but is susceptible of various changes and modifications without departing from the spirit thereof, and I desire, therefore that only such limitations shall be placed thereupon as are imposed by the prior art or as are specifically set forth in the appended claims.

What I claim is:—

1. In a thrust bearing adjusting mechanism, the combination of a housing, a rotatable shaft mounted in said housing and having a thrust collar, a bearing member engaging the thrust collar, mechanical means for moving the bearing member in the housing, and means for applying fluid pressure to the bearing member in opposition to the thrust imposed thereon whereby said mechanical means may readily move the bearing member.

2. In a thrust bearing adjusting mechanism, the combination of a stationary casing, an axially movable thrust member mounted in said casing, a shaft mounted in said casing, a thrust collar carried by said shaft and bearing against said thrust member, means for mechanically moving the thrust member axially and for fixing the axial position thereof, and means for applying fluid pressure to the thrust member for neutralizing the axial thrust thereon, thereby reducing the load on said means while moving the thrust member.

3. In a thrust bearing adjusting mechanism, the combination of a stationary casing having a cylinder portion formed therein, an axially movable thrust member mounted in said casing and having a piston portion disposed within said cylinder portion, a shaft mounted in said casing, a thrust collar carried by said shaft and engaging said thrust member, mechanical means for moving said thrust member axially of the shaft, and means for applying fluid pressure to said piston for biasing the thrust member in opposition to the thrust thereon, thereby reducing the load on said mechanical means while moving the thrust member.

4. In a thrust bearing adjusting mechanism, the combination of a stationary casing, an axially movable thrust member mounted in said casing, a shaft mounted in said casing, a thrust collar carried by said shaft and bearing against said thrust member, means for mechanically moving the thrust member axially and for fixing the axial position thereof, means for applying fluid pressure to the thrust member for neutralizing the axial thrust thereon, thereby reducing the load on said means while moving the thrust member, and means for indicating the thrust on said member.

5. In a thrust bearing adjusting mechanism, the combination of a stationary casing having a cylinder portion formed therein, an axially movable thrust member mounted in said casing and having a piston disposed within said cylinder portion, a shaft mounted in said casing, a thrust collar carried by said shaft and engaging said thrust member, mechanical means for moving said thrust member axially of the shaft, means for applying fluid pressure to said piston for biasing the thrust member in opposition to the thrust thereon, thereby reducing the load on said mechanical means while moving the thrust member, and indicating means actuated by said fluid pressure for recording the thrust on said member.

6. In a thrust bearing adjusting mechanism, the combination of an axially movable and rotatable shaft adapted to have an axial thrust imposed thereon and having a thrust collar, a thrust member engaging said thrust collar, mechanical means for adjusting the axial position of the thrust member, and means for applying a force to the thrust member in opposition to the thrust imposed thereon, whereby the stress imposed on the adjusting means may be reduced while adjusting the thrust bearing member.

7. In a thrust bearing adjusting mechanism, the combination of an axially movable and rotatable shaft adapted to have an axial thrust imposed thereon and having a thrust collar, a thrust member engaging said thrust collar, mechanical means for adjusting the axial position of the thrust member, and means for applying fluid pressure to the thrust member in opposition to the thrust imposed thereon, whereby the stress imposed on the adjusting means may be reduced while adjusting the thrust bearing member.

8. In a thrust bearing mechanism, the combination of an axially movable and rotatable shaft adapted to have an axial thrust imposed thereon and having a thrust collar, a thrust bearing member engaging said thrust collar, a structure for receiving the axial thrust from the thrust bearing member, means for transmitting thrust from the thrust bearing member to said structure and for adjusting the thrust bearing member axially with respect to said structure, and means for applying a force to the thrust bearing member in opposition to the thrust thereon to reduce the thrust on said adjusting means while adjusting the thrust bearing member, said adjusting means being adapted, after adjustment has been made, to receive the entire thrust imposed on the thrust bearing member.

9. In a thrust bearing adjusting mechanism, the combination of an axially movable and rotatable shaft adapted to have an axial thrust imposed thereon and having a thrust collar, a thrust bearing member engaging said thrust collar, a structure for receiving the axial thrust from the thrust bearing member, a screw-threaded connection between the thrust bearing member and said structure for transmitting axial thrust from the former to the latter and for moving the thrust bearing member axially and fixing the axial position thereof with respect to said structure, and means for applying fluid pressure to said thrust bearing member in opposition to the thrust thereon to reduce the friction in said screw-threaded connection while operating the same to move the thrust bearing member with respect to said structure.

ANTHONY F. SCHWENDNER.